(No Model.)

E. O. BRYDEN.
AXLE LUBRICATOR AND DUST GUARD.

No. 506,203.  Patented Oct. 10, 1893.

Witnesses

Inventor
Edward O. Bryden
by C. A. Snow & Co.
Attorneys

United States Patent Office.

EDWARD ORLANDO BRYDEN, OF RENO CITY, OKLAHOMA TERRITORY, ASSIGNOR OF ONE-HALF TO W. F. COMBS, OF SAME PLACE.

AXLE-LUBRICATOR AND DUST-GUARD.

SPECIFICATION forming part of Letters Patent No. 506,203, dated October 10, 1893.

Application filed May 9, 1893. Serial No. 473,557. (No model.)

*To all whom it may concern:*

Be it known that I, EDWARD ORLANDO BRYDEN, a citizen of the United States, residing at Reno City, in the county of Canadian and Territory of Oklahoma, have invented a new and useful Axle-Lubricator and Dust-Guard, of which the following is a specification.

The invention relates to improvements in axle lubricators.

The object of the present invention is to provide simple and efficient means whereby vehicle axles may be readily lubricated with axle-grease without removing the wheels.

The invention consists in the construction and novel combination and arrangement of parts hereinafter fully described, illustrated in the accompanying drawings, and pointed out in the claims hereto appended.

Figure 1:
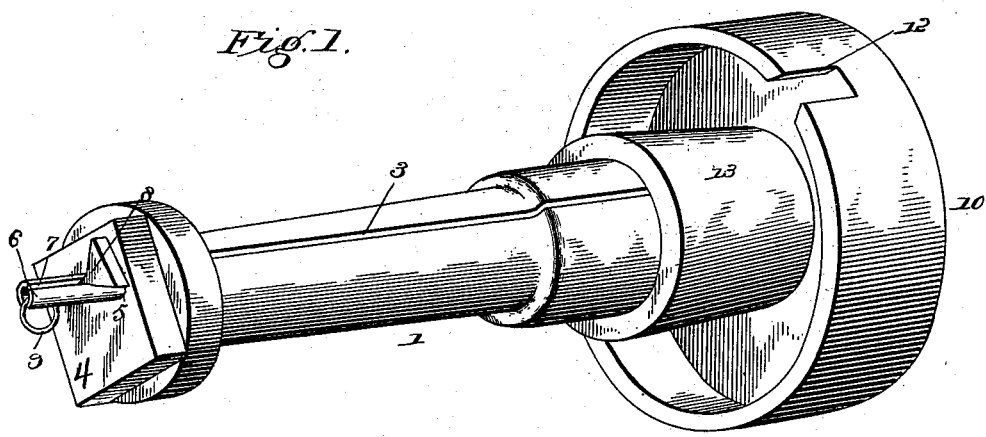
Figure 2:
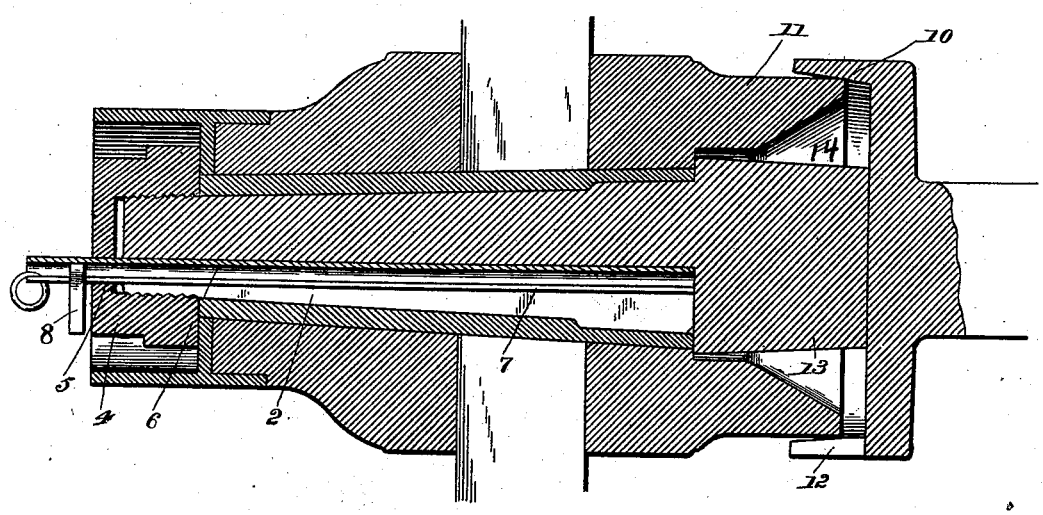
Figure 3:

In the drawings—Figure 1 is a perspective view of an axle spindle constructed in accordance with this invention. Fig. 2 is a longitudinal sectional view, the filling tube being in position. Fig. 3 is a detail perspective view of the filling tube.

Like numerals of reference indicate corresponding parts in all the figures of the drawings.

1 designates an axle spindle provided below its center with a longitudinal bore 2, and having a slot 3 extending longitudinally of the bottom and communicating with the bore. The inner end of the slot extends through the swell of the spindle and is thereby deepened and causes the lubricant to collect there, whereby the corresponding portion is always liberally supplied with grease which is not the case when an axle is greased by hand. The nut 4, at the outer end of the spindle, is provided with an eccentrically arranged perforation 5, which is adapted to register with the bore when the nut is turned back a short distance, to permit the insertion of a filling tube 6; and after the filling tube has been inserted and emptied and the axle lubricated, the nut is turned fast to carry the perforation 5 away from the outer end of the bore for closing the latter.

The filling tube is provided with a longitudinal opening 7, to permit the passage of a follower 8, which is arranged within the filling tube and which extends through the opening, and is enlarged to form a handle portion $8^a$. In lubricating the axle, the filling tube is inserted or embedded in a suitable lubricant, such as axle grease, to fill it, after which it will be inserted in the bore of the spindle. The operator then holds the follower against the end or outer face of the nut and withdraws the filling tube, thereby expelling and leaving within the bore of the spindle the contents of the filling tube.

The filling tube is provided at its outer end, with a finger ring 9 to enable the tube to be readily withdrawn from the bore of the spindle.

A piece of sponge may be placed in the slot of the spindle to retard the flow of the lubricant.

It will be readily apparent that the means for lubricating an axle is simple and efficient, and that an axle may be quickly and rapidly lubricated without inconvenience and without necessitating the removal of a wheel, and the total unscrewing of an axle nut.

The dust and sand are excluded from the axle box by a cylindrical cap 10, arranged at the inner end of the spindle, and receiving and having inserted into it the inner end of a hub 11. The cylindrical cap may be constructed separate from the spindle, but is preferably formed integral therewith, as illustrated in the accompanying drawings; and is provided at its bottom with a discharge recess 12, having beveled edges. Any dust and dirt falling upon the hub and sifting under the cap will be carried downward by the rotation of the hub, and will be discharged through the opening or recess 12.

The improvements herein set forth are applicable to all classes of vehicles, and may be advantageously applied to traction wheels, harvesting machines, and the like.

Changes in the form, proportion and the minor details of construction may be resorted to without departing from the principle or sacrificing any of the advantages of this invention.

The spindle is provided at its inner end adjacent to the dust excluding cap with a frusto-conical portion 13, which tapers toward the cap to cause dust and dirt to move away from the axle box and escape through the discharge opening in case any dirt should get at the inner end of the hub.

It is advantageous to use the ordinary axle grease for lubricating the spindle, as will be readily understood, but, any other suitable lubricant, such as oil, may if desired be employed.

The inner end of the hub has a conical recess 14, which operates to cause any dust or accumulation to be discharged through the opening 12, as it presents an inclined surface to such accumulation.

What I claim is—

1. The combination with an axle provided in its spindle with a longitudinal bore, and having a slot communicating therewith of a filling tube adapted to be inserted in the bore and provided with a longitudinal opening, and a follower arranged within the filling tube and extending through the opening to enable the contents of the tube to be readily removed, substantially as described.

2. The combination with an axle provided in its spindle with a bore and having a slot communicating therewith, of a filling tube adapted to be inserted in the bore and having a longitudinal opening, a follower arranged within the tube and extending through the opening and provided with a handle, and a ring arranged at the outer end of the tube, substantially as described.

3. The combination of a spindle provided at its inner end with a cylindrical cap having a discharge opening at the bottom for the escape of dirt, and a hub arranged on the spindle and fitting in the cap, substantially as described.

4. The combination of a spindle provided at its inner end with a cylindrical cap having a discharge opening, said spindle being provided in advance of the cap with a frusto-conical portion tapering toward the cap, and a hub arranged on the spindle and fitting in the cap, substantially as described.

5. The combination of a spindle provided at its inner end with a cylindrical cap having a discharge opening, and a hub arranged on the spindle and fitting in the cap and provided at its inner end with a conical recess, substantially as and for the purpose described.

6. The combination of a spindle provided at its inner end with a cylindrical cap having a discharge opening, said spindle being provided in advance of the cap with a frusto-conical portion tapering toward the cap, and a hub arranged on the spindle and fitting in the recess of the cap and provided at its inner end with a conical recess, substantially as and for the purpose described.

In testimony that I claim the foregoing as my own I have hereto affixed my signature in the presence of two witnesses.

EDWARD ORLANDO BRYDEN.

Witnesses:
EZRA LOWE DAVIS,
CLARK BLACK.